United States Patent
Luo et al.

(10) Patent No.: US 10,735,918 B2
(45) Date of Patent: Aug. 4, 2020

(54) INFORMATION PROCESSING METHOD AND APPARATUS, AND ELECTRONIC DEVICE AND COMPUTER READABLE MEDIUM THEREOF

(71) Applicant: Lenovo (Beijing) Co., Ltd., Beijing (CN)

(72) Inventors: Yingwen Luo, Beijing (CN); Yaqiang Wu, Beijing (CN); Maogang Chen, Beijing (CN); Xuerong Zhang, Beijing (CN); Wei Xu, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/351,810

(22) Filed: Mar. 13, 2019

(65) Prior Publication Data

US 2019/0289438 A1    Sep. 19, 2019

(30) Foreign Application Priority Data

Mar. 13, 2018  (CN) .......................... 2018 1 0207974

(51) Int. Cl.
*H04W 4/12*    (2009.01)
*H04W 4/21*    (2018.01)
*H04W 4/50*    (2018.01)

(52) U.S. Cl.
CPC ............. *H04W 4/12* (2013.01); *H04W 4/21* (2018.02); *H04W 4/50* (2018.02)

(58) Field of Classification Search
CPC .... G06F 9/542; G06F 2221/2141; G06F 9/54; G06F 9/544; H04W 12/0027
See application file for complete search history.

(56) References Cited

U.S. PATENT DOCUMENTS

| | | | |
|---|---|---|---|
| 7,472,396 B2 * | 12/2008 | Jacobs .................... | G06F 9/542 719/318 |
| 7,711,783 B1 * | 5/2010 | Violleau ............... | H04L 63/101 709/206 |
| 9,524,198 B2 * | 12/2016 | Doshi ..................... | G06F 9/542 |
| 9,529,579 B2 * | 12/2016 | Brunet ..................... | G06F 8/65 |
| 2002/0035649 A1 * | 3/2002 | Korn ....................... | G06F 9/542 719/318 |
| 2005/0097567 A1 * | 5/2005 | Monnie .................... | G06F 9/52 719/315 |
| 2017/0243252 A1 * | 8/2017 | Feadler .................. | G06Q 30/02 |
| 2017/0255967 A1 * | 9/2017 | Feadler ................... | H04L 67/42 |
| 2018/0089898 A1 * | 3/2018 | Huddy ................... | H04W 4/029 |
| 2019/0289438 A1 * | 9/2019 | Luo ......................... | H04W 4/12 |

FOREIGN PATENT DOCUMENTS

CN    106302106 A    *    1/2017

OTHER PUBLICATIONS

Google Translation of CN-106302106-A (Year: 2017).*

* cited by examiner

*Primary Examiner* — Matthew C Sams
(74) *Attorney, Agent, or Firm* — Anova Law Group, PLLC

(57) ABSTRACT

An information processing method for an electronic device is provided. The method includes: receiving a message through a first application installed on the electronic device; determining whether a second application installed on the electronic device has a permission to identify the message received by the first application; and in response to the second application having the permission to identify the message received by the first application, the second application performing an operation in relation to the message.

11 Claims, 14 Drawing Sheets

INFORMATION PROCESSING METHOD AND APPARATUS, AND ELECTRONIC DEVICE AND COMPUTER READABLE MEDIUM THEREOF

CROSS-REFERENCE TO RELATED APPLICATION

This application claims the priority to Chinese Patent Application No. 201810207974.5, entitled "Information Processing Method and Apparatus, and Electronic Device and Computer Readable Medium Thereof," filed on Mar. 13, 2018, the entire content of which is incorporated herein by reference.

TECHNICAL FIELD

The present disclosure relates to information processing methods and apparatuses, and electronic devices and computer readable media thereof.

BACKGROUND

With the development of computer technology, various applications have emerged, such as social media software applications, short message service (SMS) software applications, and online games software applications. In certain scenarios, in order to control a target application to perform corresponding operations, a user may need to acquire related information through another application software, so that the target application may perform subsequent corresponding operations according to the related information. In this case, the user usually needs to acquire information through the other application software, and then input the acquired information into the target application. The foregoing operation process may be cumbersome, resulting in poor user experience.

SUMMARY

One aspect of the present disclosure provides an information processing method for an electronic device. The method includes: receiving a message through a first application installed on the electronic device; determining whether a second application installed on the electronic device has permission to identify the message received by the first application; and in response to the second application having permission to identify the message received by the first application, the second application performing an operation in relation to the message.

In certain embodiments, performing the operation in relation to the message includes: acquiring target information in the message by the second application; and performing the operation by the second application in according to the target information.

In certain embodiments, the method further includes: in response to the second application not having permission to identify the message received by the first application, detecting whether an event listener has been registered in an operating system of the electronic device, wherein the event listener is configured to inform the second application that the first application has received a message; and in response to the event listener having been registered in the operating system, acquiring the target information in the message by the second application, and performing the target operation by the second application according to the target information.

In certain embodiments, acquiring the target information in the message by the second application includes: displaying a control in a display area of the electronic device, wherein the control indicates that the event listener has been registered in the operating system; receiving a user operation on the control; and after receiving the user operation on the control, acquiring the target information in the message by the second application.

In certain embodiments, acquiring the target information in the message by the second application includes: receiving, by the second application, the message forwarded from the operating system; and acquiring the target information in the message by the second application according to the message forwarded from the operating system.

In certain embodiments, determining whether the second application has permission to identify the message received by the first application includes: acquiring identification information of the second application; and determining, according to the identification information corresponding to the second application, whether the second application has permission to identify the message received by the first application.

In certain embodiments, the second application is one of a plurality of second applications, and before acquiring identification information corresponding to any of the plurality of second applications, the method further includes: classifying the plurality of second applications into a plurality of application types according to a rule, each second application being assigned an application type; and tagging corresponding identification information to each of the plurality of second applications according to the corresponding application type.

In another aspect of the present disclosure, an electronic device is provided. The electronic device includes: a memory storing computer instructions; and a processor configured to execute the computer instructions to perform: receiving a message through a first application installed on the electronic device; determining whether a second application installed on the electronic device has permission to identify the message received by the first application; and in response to the second application having permission to identify the message received by the first application, the second application performing an operation in relation to the message.

In certain embodiments, in the electronic device, the processor is further configured to perform: in response to the second application not having permission to identify the message received by the first application, detecting whether an event listener has been registered in an operating system of the electronic device, wherein the event listener is configured to inform the second application that the first application has received a message; and in response to the event listener being registered in the operating system, acquiring the target information in the message by the second application, and performing the target operation by the second application according to the target information.

In certain embodiments, the processor is further configured to perform: displaying a control in a display area of the electronic device, wherein the control indicates that the event listener has been registered in the operating system; receiving a user operation on the control; and after receiving the user operation on the control, acquiring the target information in the message by the second application.

In certain embodiments, the processor is further configured to perform: receiving, by the second application, the message forwarded from the operating system; and acquiring the target information in the message by the second application according to the message forwarded from the operating system.

In certain embodiments, the processor is further configured to perform: acquiring identification information of the second application; and determining, according to the identification information corresponding to the second application, whether the second application has permission to identify the message received by the first application.

In certain embodiments, the second application is one of a plurality of second applications, and the processor is further configured to perform: classifying the plurality of second applications in to a plurality of application types according to a preset rule, each second application being assigned an application type; and tagging corresponding identification information to each of the plurality of second applications according to the corresponding application type.

The above aspects will be explained in detail with accompanying drawings.

BRIEF DESCRIPTION OF THE DRAWINGS

In order to more clearly illustrate the technical solutions provided by the present disclosure, the drawings used in the description of the embodiments will be briefly described below.

DETAILED DESCRIPTION OF THE EMBODIMENTS

Figure 1:
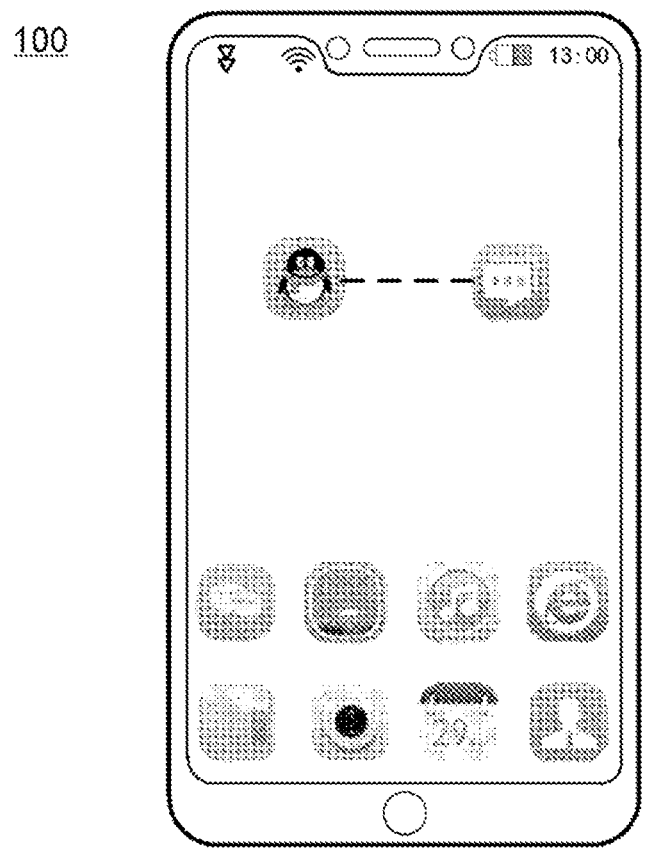
FIG. 1 is a schematic diagram showing an application scenario of an information processing method and system according to certain embodiments of the present disclosure.

In the following detailed description, numerous specific details are set forth to provide a thorough understanding of the embodiments of the present disclosure. However, it should be apparent that one or more embodiments may be practiced without these specific details. In addition, descriptions of well-known structures and techniques are omitted in the following description in order to avoid unnecessarily obscuring the concept of the present disclosure.

In the present disclosure, the terms "comprise", "comprising", "include", "including", or any terms derived from them are non-exclusive. An element that is defined by the phrase "comprising a . . . " does not exclude the presence of additional elements in the process, method, item, or device that comprises the element. For simplification purposes, detailed descriptions of the operations of exemplary systems, devices, and units may be omitted, and references can be made to the descriptions of the exemplary methods.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure.

An expression such as "at least one of A, B, and C, etc." should generally be interpreted in accordance with the meaning of the expression as commonly understood by those skilled in the art. For example, "a system having at least one of: A, B, and C" shall include, but are not limited to, systems having A alone, B alone, C alone, A and B, A and C, B and C, and/or A, B, C, etc. An expression such as "least one of A, B or C, etc." should generally be interpreted according to the meaning of the expression as commonly understood by those skilled in the art. For example, "a system having at least one of: A, B, or C" shall include, but are not limited to, systems having A alone, B alone, C alone, A and B, A and C, B and C, and/or A, B, C, etc. Those skilled in the art will also appreciate that transitional conjunctions and/or phrases that are representing two or more optional items, whether in the specification, claims, or drawings, are to be construed as either or both items. For example, the phrase "A or B" should be understood to include the possibility of "A" or "B", or "A and B".

Some block diagrams and/or flowcharts are presented in the drawings. It should be understood that some blocks of the block diagrams and/or flowcharts, or a combination thereof, may be implemented by computer program instructions. These computer program instructions may be provided to a general-purpose computer, a special purpose computer or a processor of other programmable data processing apparatus, so that when executed by the processor, the instructions may be used to implement the functions illustrated in the block diagrams and/or flowcharts.

Thus, the techniques described in the present disclosure may be implemented in the form of hardware and/or software (including firmware, microcode, etc.). Further, the techniques described in the present disclosure may take the form of a computer program product on a computer readable medium storing instruction for use by or in connection with an instruction execution system. In the context of the present disclosure, a computer readable medium may be any medium that can contain, store, communicate, propagate or transport the instructions. For example, a computer readable medium may include, but is not limited to, an electronic, magnetic, optical, electromagnetic, infrared, or semiconductor system, apparatus, device, or propagation medium. Specific examples of the computer readable medium may include: a magnetic storage device such as a magnetic tape or a hard disk drive (HDD); an optical storage device such as a compact disk (CD-ROM); a memory such as a random-access memory (RAM) or a flash memory; and/or a wired/Wireless communication link.

The present disclosure provides an information processing method and apparatus according to certain embodiments. The method may include: receiving an instant message by a first application; determining whether a second application has permission to identify the instant message received by the first application; and when the second application has permission to identify the instant message received by the first application, acquiring target information in the instant message by the second application, so that the second application may perform a target operation according to the target information.

FIG. 1 schematically illustrates an application scenario of an information processing method and system according to certain embodiments. As shown in FIG. 1, the application scenario may include an electronic device 100. Multiple applications may be installed on the electronic device 100. For example, the installed applications may include but are not limited to a short message service (SMS) application, a QQ application, a WeChat application, a media player application, and so on. The user may implement information interaction operations through the various applications installed on the electronic device 100.

According to certain embodiments, when it is determined that a second application has permission to identify an instant message received by a first application, the second application may directly acquire target information in the instant message, so that the second application may perform an operation according to the target information. Taking the SMS application (the first application) and the QQ application (the second application) as an example, the SMS application may receive an instant message. When the QQ application has permission to identify the instant message received by the SMS application, the QQ application may directly acquire target information in the instant message, so that the QQ application may perform a target operation according to the target information.

As demonstrated by certain embodiments, the method provided by the present disclosure does not require manual input of the target information, thus simplifying operation procedures for the users and improving information processing efficiency. The provided method and apparatus address the technical problem that when controlling a target application to perform a corresponding operation, a user needs to acquire the information through another application software and then input the acquired information into the target application, which involves cumbersome user operation.

It should be noted that FIG. 1 is an exemplary a scenario in which certain embodiments of the present disclosure may be applied. It is to help those skilled in the art understand the technical content of the present disclosure. The embodiments may be used for other devices, systems, environments or scenarios.

Figure 2:
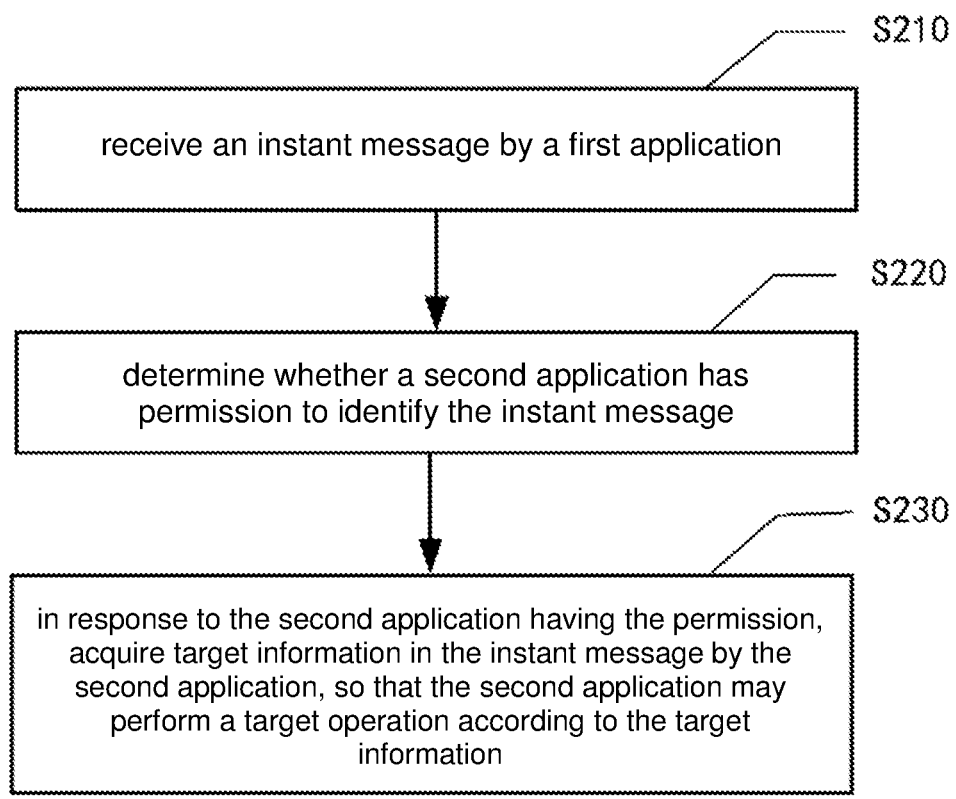
FIG. 2 is a flowchart of an information processing method according to certain embodiments of the present disclosure.

FIG. 2 is a flowchart of an information processing method according to certain embodiments of the present disclosure. The method may be applied to an electronic device, such as the electronic device 100 in FIG. 1. As shown in FIG. 2, the information processing method may include Steps S210 to S230.

In Step S210, the electronic device may receive an instant message by a first application. The application type of the first application is not limited in the present disclosure. For example, it may be an SMS application, a WeChat application, a QQ application, etc. The form of the instant message is not limited either. It may be, for example, a text or a voice message, a WeChat or a QQ message, and so on.

In Step S220, the electronic device may determine whether a second application has permission to identify the instant message received by the first application. The application type of the second application is not limited in the present disclosure. For example, it may be an SMS application, a WeChat application, a QQ application, a shopping application, and so on.

In Step S230, when it is determined that the second application has permission to identify the instant message received by the first application, the electronic device may acquire target information in the instant message by the second application, so that the second application may perform a target operation according to the target information.

According to certain embodiments, when the second application has permission to identify the instant message received by the first application, certain target information in the instant message may be acquired by the second application. The target information may be part or all of the information of the instant message. For example, if the content of the instant message is to wake up a user at 7:30 AM, the target information may be to perform a wake-up call at 7:30 AM.

According to certain embodiments, for example, user A may send an instant message to user B having the content "wake me up at 7:30 AM". After user B receives the instant message through an SMS application, if an alarm clock application has permission to identify the instant message received by the SMS application, the alarm clock application may acquire target information in the instant message. For example, the target information may be "wake-up call at 7:30 AM". Next, the alarm clock application may configure an alarm according to the acquired target information "wake-up call at 7:30 AM".

According to certain embodiments, since the second application has permission to identify the instant message received by the first application, manual input of the target information may not be required, thus simplifying operation procedures for the users and improving information processing efficiency. The provided method and apparatus address the technical problem that when controlling a target application to perform a corresponding operation, a user needs to acquire the information through another application software and then input the acquired information into the target application, which involves cumbersome user operation.

Figure 3:
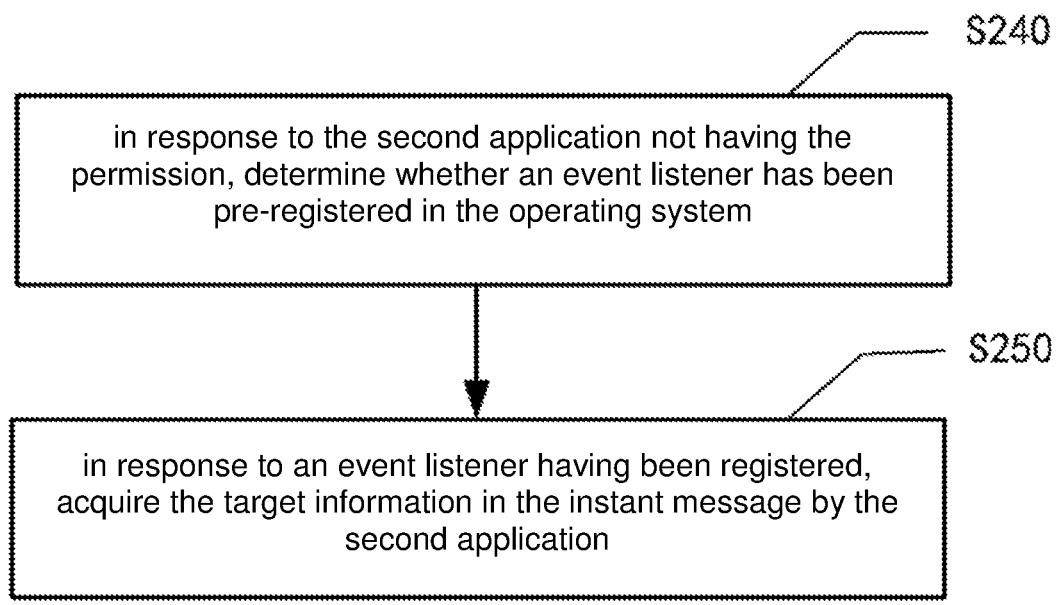
FIG. 3 is a flowchart of an information processing method according to certain other embodiments of the present disclosure.

The information processing method provided by the present disclosure will be further described below with reference to FIGS. 3-7. FIG. 3 is a flowchart of an information processing method according to certain embodiments of the present disclosure. The method may be applied on an electronic device such as the electronic device 100 in FIG. 1. The electronic device may have an operating system installed. As shown in FIG. 3, in addition to Steps S210-230 shown in FIG. 2, the information processing method may further include Steps S240 to S250.

In Step S240, if it is determined that the second application does not have permission to identify the instant message received by the first application, the electronic device may determine whether an event listener has been pre-registered in the operating system. The event listener is configured to inform the second application that the first application has received an instant message.

According to certain embodiments, the operating system may determine which applications installed on the electronic device have permissions to identify the instant message received by the first application and which applications do not have permissions to identify the instant message received by the first application.

According to certain embodiments, in a scenario where it is determined that the second application does not have permission to identify the instant message received by the first application, the electronic device may determine whether an event listener associated with the second application has been registered in the operating system. According to certain embodiments, determining whether the event listener has been registered in the operating system may be implemented by inquiring whether the application currently interacting with the electronic device (that is, the application running on the top layer of the electronic device) has pre-registered an event listener in the operating system to receive instant messages.

In Step S250, if an event listener has been registered in the operating system, the second application may acquire the target information in the instant message, so that the second application may perform the target operation according to the target information.

According to certain embodiments, the event listener may inform the second application that the first application has received the instant message, and the event listener may invoke an API interface of the first application to acquire the instant message received by the first application. Then the event listener may transmit the instant message to the second application, so that the second application may acquire the target information in the instant message.

According to certain embodiments, if the second application does not have permission to identify the instant message received by the first application, the electronic device may detect whether an event listener has been registered in the operating system. When the event listener has been registered in the operating system, the second application may acquire the target information in the instant message through the event listener, thus simplifying user operation process and improving user experience.

Figure 4:
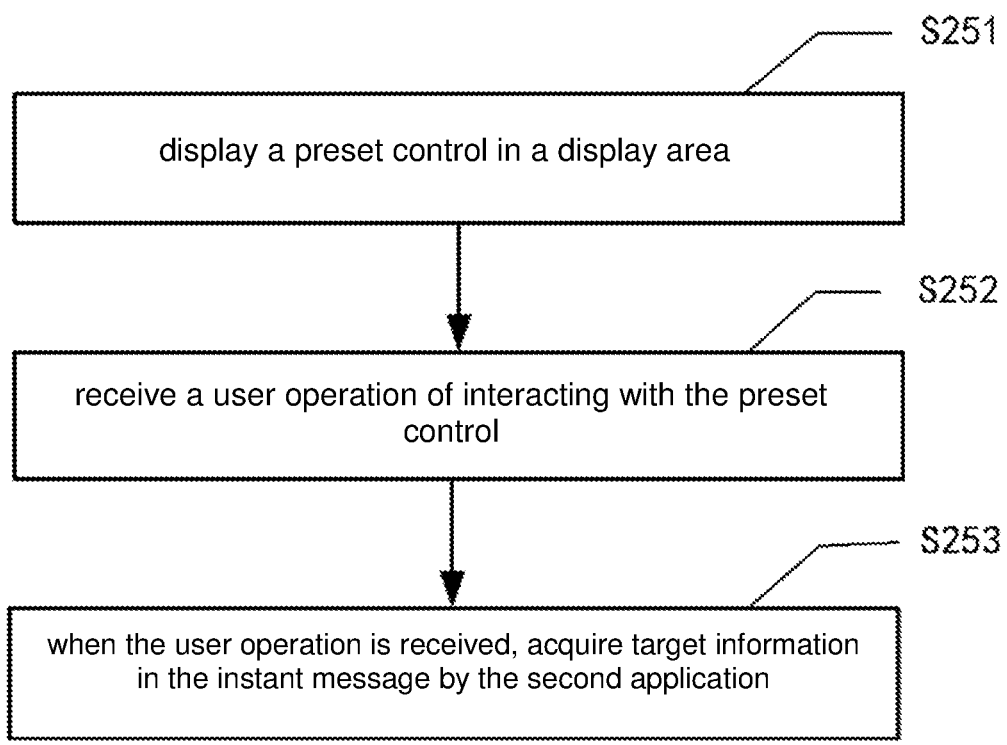
FIG. 4 is a flowchart illustrating a process of acquiring target information in an instant message by a second application according to certain embodiments of the present disclosure.

FIG. 4 is a flow chart illustrating the process of acquiring target information in the instant message by the second application according to certain embodiments. The information processing method may be applied to an electronic device. As shown in FIG. 4, when an event listener has been registered in the operating system, acquiring target information in the instant message received by the second application may include Steps S251 to S253.

In Step S251, the electronic devices may display a preset control in a display area of the electronic device. The preset control is configured to indicate that an event listener has been registered in the operating system. According to certain embodiments, the preset control may be a button. When the first application receives the instant message and the event listener has been registered in the operating system, the preset control may be displayed in a display area of the electronic device. The display area may be an area that displays some or all of the instant message. For example, the instant message may be a text message, and the preset control may be displayed near the last line or the first line of the displayed text message.

In Step S252, the electronic device may receive a user operation of interacting with the preset control.

In Step S253, when the user operation is received, the second application may acquire target information in the instant message. According to certain embodiments, in a scenario where an event listener has been registered in the operating system of the electronic device, and when a user operation is received, the instant message may be forwarded to the second application, and the second application may acquire the target information in the instant message. If a user operation is not received while the event listener has been registered in the operating system, the instant message may not be forwarded to the second application.

According to certain embodiments, in the scenario that an event listener has been registered in the operating system, the target information is acquired only when a user operation of interacting with the preset control is received. This process may improve information security and user privacy protection.

Figure 5:
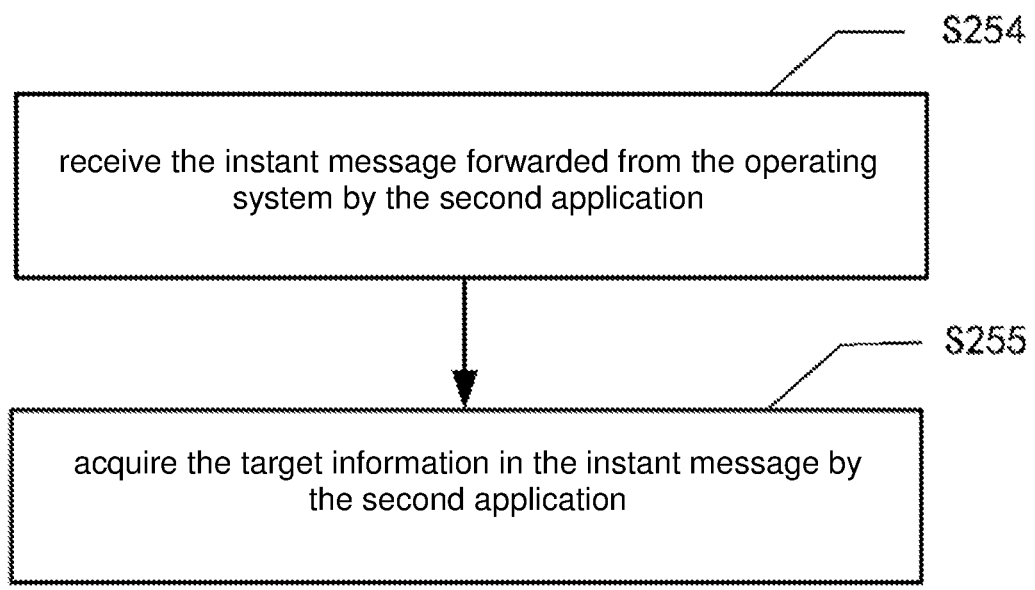
FIG. 5 is a flowchart illustrating a process of acquiring target information in an instant message by a second application according to certain other embodiments of the present disclosure.

FIG. 5 is a flow chart illustrating the process of acquiring target information in the instant message by the second application according to certain other embodiment of the present disclosure. As shown in FIG. 5, in the scenario that an event listener has been registered in the operating system of the electronic device, the process of acquiring the target information in the instant message by the second application may include Steps S254 to S255.

In Step S254, the second application may receive the instant message forwarded from the operating system.

In Step S255, the second application may acquire the target information in the instant message according to the instant message forwarded by the operating system. According to certain embodiments, when the first application receives the instant message, the instant message may be forwarded to the second application by the operating system without manual operation by the user. For example, when the user needs to register as a member of the second application, a server of the second application may send a text message to the user. The text message may have a verification code as the target information. When the second application does not have permission to identify the verification code, if an event listener has been registered in the operating system, the operating system may forward the instant message to the second application. The second application may acquire the target information in the instant message and automatically fill the verification code. This process may simplify user operation and enhance user experience. Further, in the scenario that a user operation on the preset control is received, the second application may acquire the target information in the instant message, thereby automatically filling the verification code without causing security or privacy issues.

Figure 6:
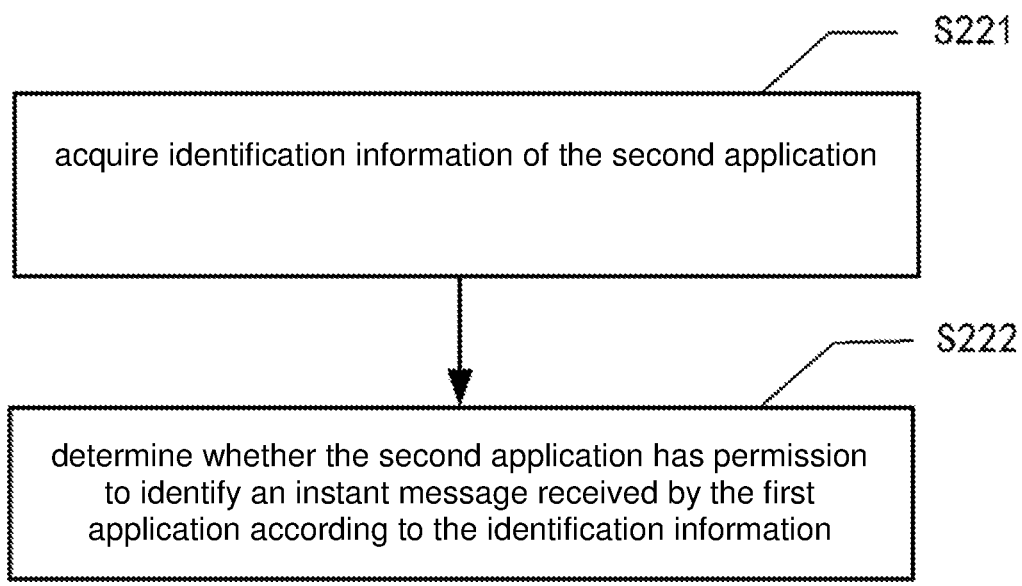
FIG. 6 is a flowchart illustrating the process of determining whether a second application has permission to identify an instant message received by a first application according to certain embodiments of the present disclosure.

FIG. 6 is a flow chart illustrating the process of determining whether the second application has permission to identify an instant message received by the first application according to certain embodiments of the present disclosure. As shown in FIG. 6, determining whether the second application has permission to identify the instant message received by the first application may include Steps S221 to S222.

In Step S221, the electronic device may acquire identification information of the second application.

In Step S222, the electronic device may determine whether the second application has permission to identify an instant message received by the first application according to the identification information of the second application. According to certain embodiments, the second application may have identification information that indicates whether there is permission to identify the instant message received by the first application. The operating system may determine, according to the identification information, whether the second application has permission to identify the instant message received by the first application.

Figure 7:
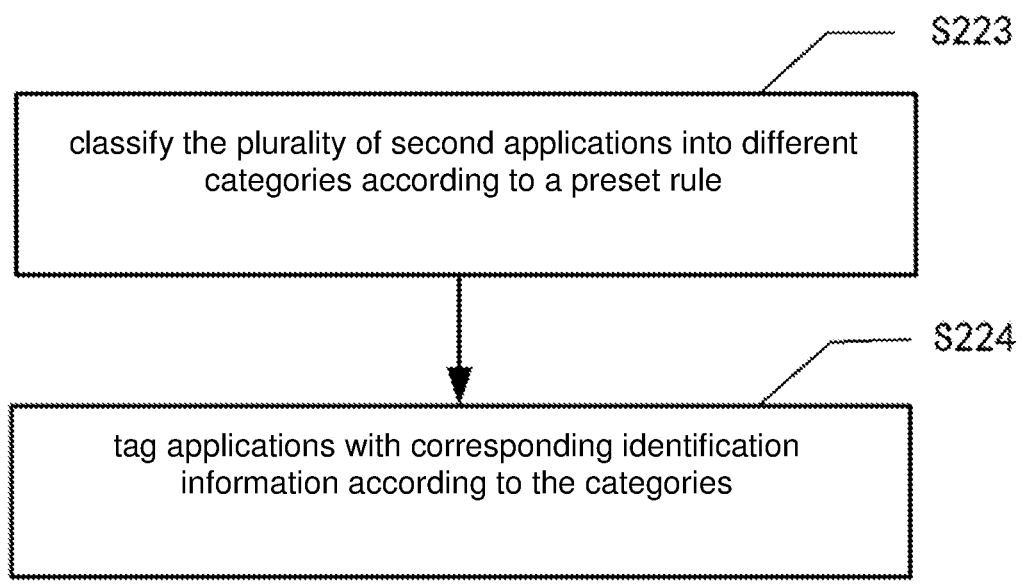
FIG. 7 is a flowchart of an information processing method according to certain other embodiments of the present disclosure.

FIG. 7 is a flowchart of an information processing method according to certain other embodiments of the present disclosure. According to certain embodiments, there may be a plurality of second applications. Before acquiring the corresponding identification information of the second applications, as shown in FIG. 7, the information processing method may further include Steps S223 to S224.

In Step S223, the operating system may classify the plurality of second applications into different categories according to a preset rule. According to certain embodiments, when the user launches a second application, a selection window may automatically pop up to allow the user to choose whether to allow the second application to acquire the instant message. Alternatively, a selection interface may allow the user to choose whether to allow a second application to acquire the instant message when the second application is being installed. According to certain embodiments, the plurality of second applications may be classified in the foregoing manner into different categories.

In Step S224, the electronic device may tag applications with corresponding identification information according to the categories. According to certain embodiments, an application installed on the electronic device may be classified in advance, for example, into a trusted application and an indeterminate application, and corresponding identification information may be tagged to applications belonging to different categories.

According to certain embodiments, when there is a new instant message, the electronic device may directly determine whether a certain application has permission to directly acquire the instant message according to its identification information, thereby improving information processing efficiency.

Figure 8:
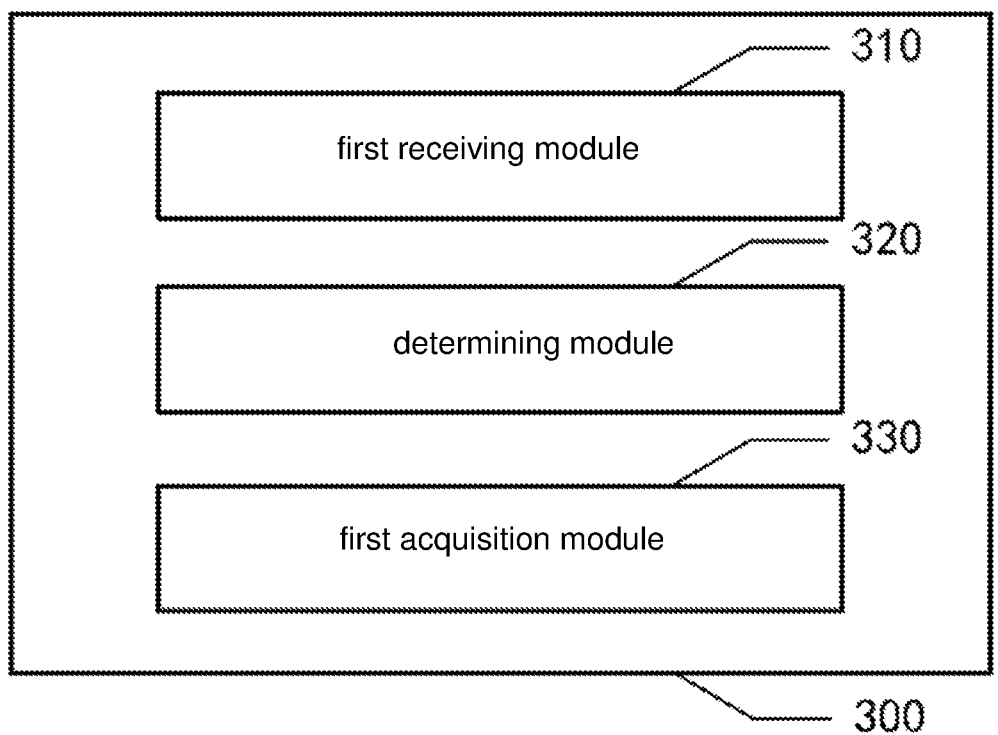
FIG. 8 is a block diagram of an information processing apparatus according to certain embodiments of the present disclosure.

FIG. 8 is a block diagram of an information processing apparatus according to certain embodiments of the present disclosure. The information processing apparatus 300 may perform the foregoing methods and processes illustrated in FIGS. 2 to 7.

As shown in FIG. 8, the information processing apparatus 300 may include a first receiving module 310, a determining module 320, and a first acquisition module 330. The first receiving module 310 is configured to receive the instant message by the first application. The determining module 320 is configured to determine whether the second application has permission to identify the instant message received by the first application. The first acquisition module 330 is configured to acquire target information in the instant message by the second application if the second application has permission to identify the instant message received by the first application, so that the second application may perform a target operation according to the target information.

According to certain embodiments, since the second application has permission to identify the instant message received by the first application, manual input of the target information may not be required, thus simplifying operation procedures for the users and improving information processing efficiency. The provided method and apparatus address the technical problem that when controlling a target application to perform a corresponding operation, a user needs to acquire the information through another application software and then input the acquired information into the target application, which involves cumbersome user operation.

Figure 9:
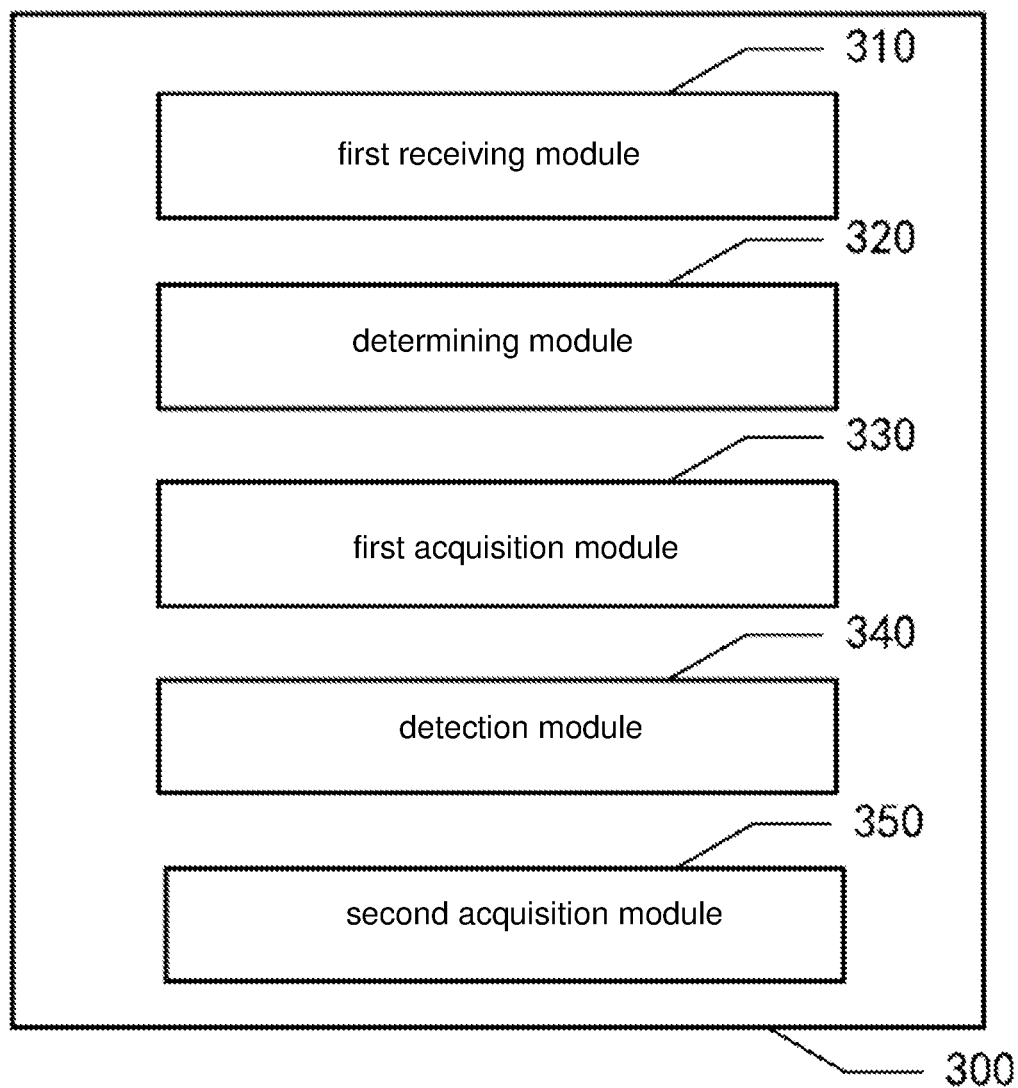
FIG. 9 is a block diagram of an information processing apparatus according to certain other embodiments of the present disclosure.

FIG. 9 is a block diagram of an information processing apparatus according to certain other embodiments of the present disclosure. As shown in FIG. 9, according to certain embodiments, the information processing apparatus 300 may include a detection module 340 and a second acquisition module 350 in addition to the first receiving module 310, the determining module 320, and the first acquisition module 330.

The detection module 340 is configured to detect whether an event listener has been registered in the operating system if the second application does not have permission to identify the instant message received by the first application. The event listener is configured to inform the second application that the first application has received an instant message. The second acquisition module 350 is configured to acquire target information in the instant message by the second application if the event listener has been registered in the operating system, so that the second application may perform a target operation according to the target information.

According to certain embodiments, if the second application does not have permission to identify the instant message received by the first application, the apparatus may detect whether an event listener has been registered in the operating system. When the event listener has been registered in the operating system, the second application may acquire the target information in the instant message through the event listener, thus simplifying user operation process and improving user experience.

Figure 10:
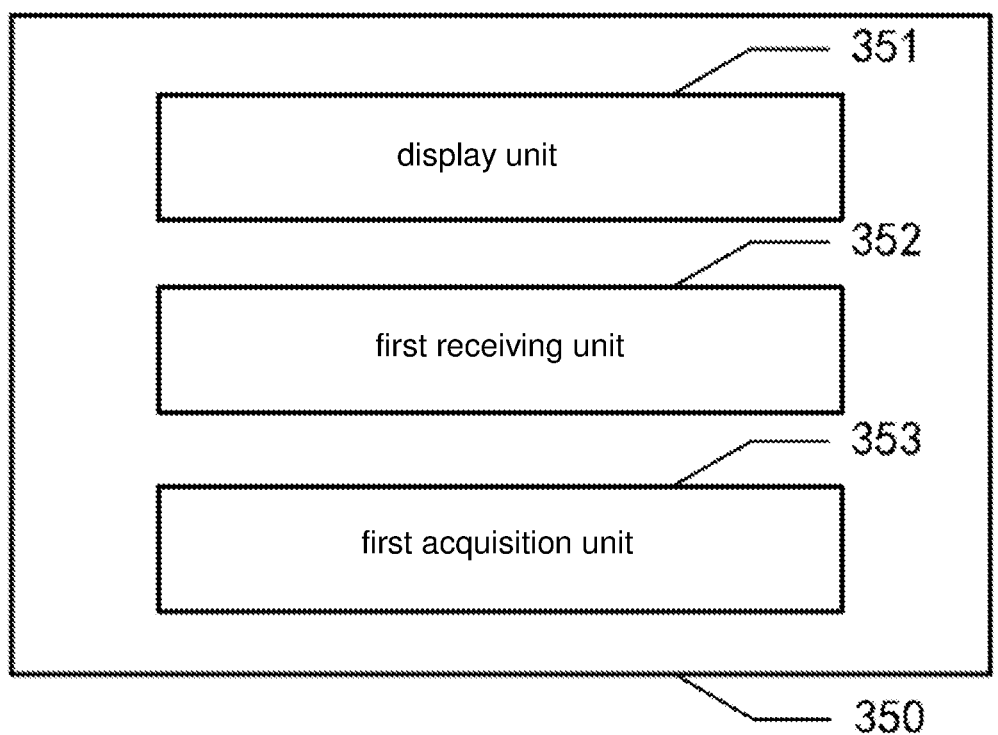
FIG. 10 is a block diagram of a second acquisition module according to certain embodiments of the present disclosure.

FIG. 10 is a block diagram of the second acquisition module according to certain embodiments of the present disclosure. As shown in FIG. 10, according to certain embodiments, the second acquisition module 350 may include a display unit 351, a first receiving unit 352, and a first acquisition unit 353. The display unit 351 is configured to display a preset control in a display area of the electronic device. The preset control is configured to indicate that an event listener has been registered in the operating system. The first receiving unit 352 is configured to receive a user operation of interacting with the preset control. The first acquisition unit 353 is configured to acquire target information in the instant message using the second application when the user operation is received.

According to certain embodiments, if an event listener has been registered in the operating system, the target information is acquired only when a user operation of interacting with the preset control is received. This process enhances information security and user privacy protection.

Figure 11:
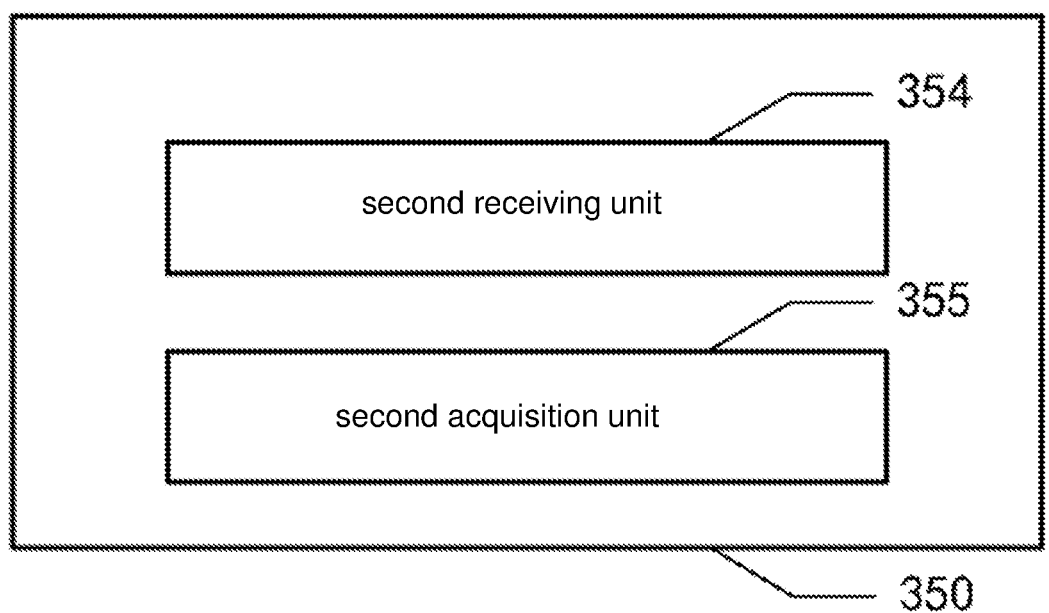
FIG. 11 is a block diagram of a second acquisition module according to certain other embodiments of the present disclosure.

FIG. 11 is a block diagram of the second acquisition module according to certain other embodiments of the present disclosure. As shown in FIG. 11, in certain embodiments, the second acquisition module 350 may include a second receiving unit 354 and a second acquisition unit 355. The second receiving unit 354 is configured to receive the instant message forwarded by the operating system via the second application. The second acquisition unit 355 is configured to acquire target information in the instant message by the second application according to the instant message forwarded by the operating system.

Figure 12:
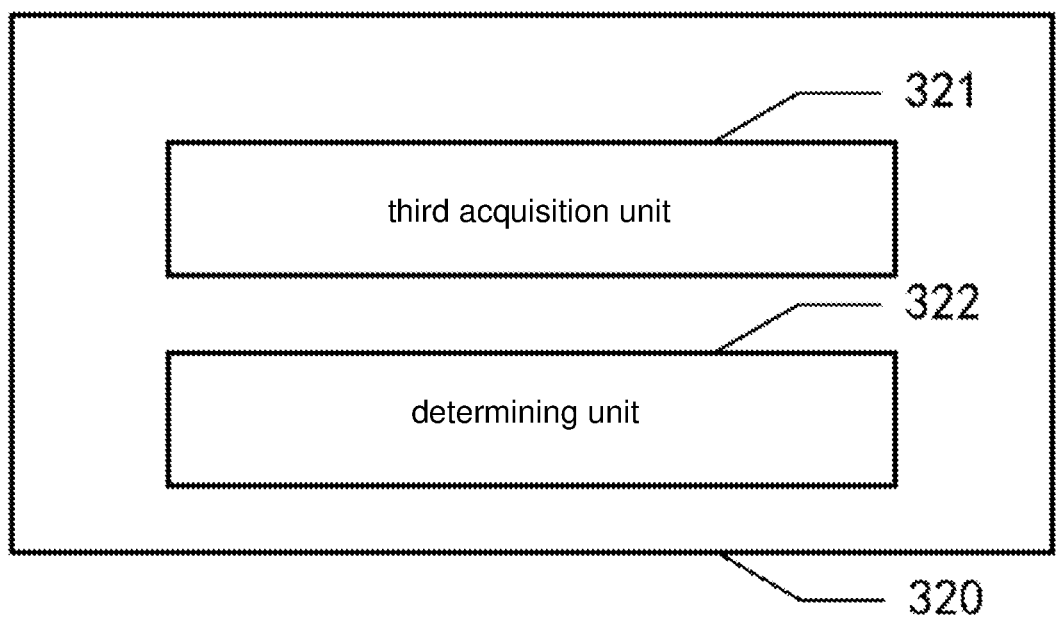
FIG. 12 is a block diagram of a determining module according to certain embodiments of the present disclosure.

FIG. 12 is a block diagram of the determining module according to certain embodiments of the present disclosure. As shown in FIG. 12, in certain embodiments, the determining module 320 may include a third acquisition unit 321 and a determining unit 322.

The third acquisition unit 321 is configured to acquire identification information of the second application. The determining unit 322 is configured to determine, according to the identification information of the second application, whether the second application has permission to identify the instant message received by the first application.

Figure 13:
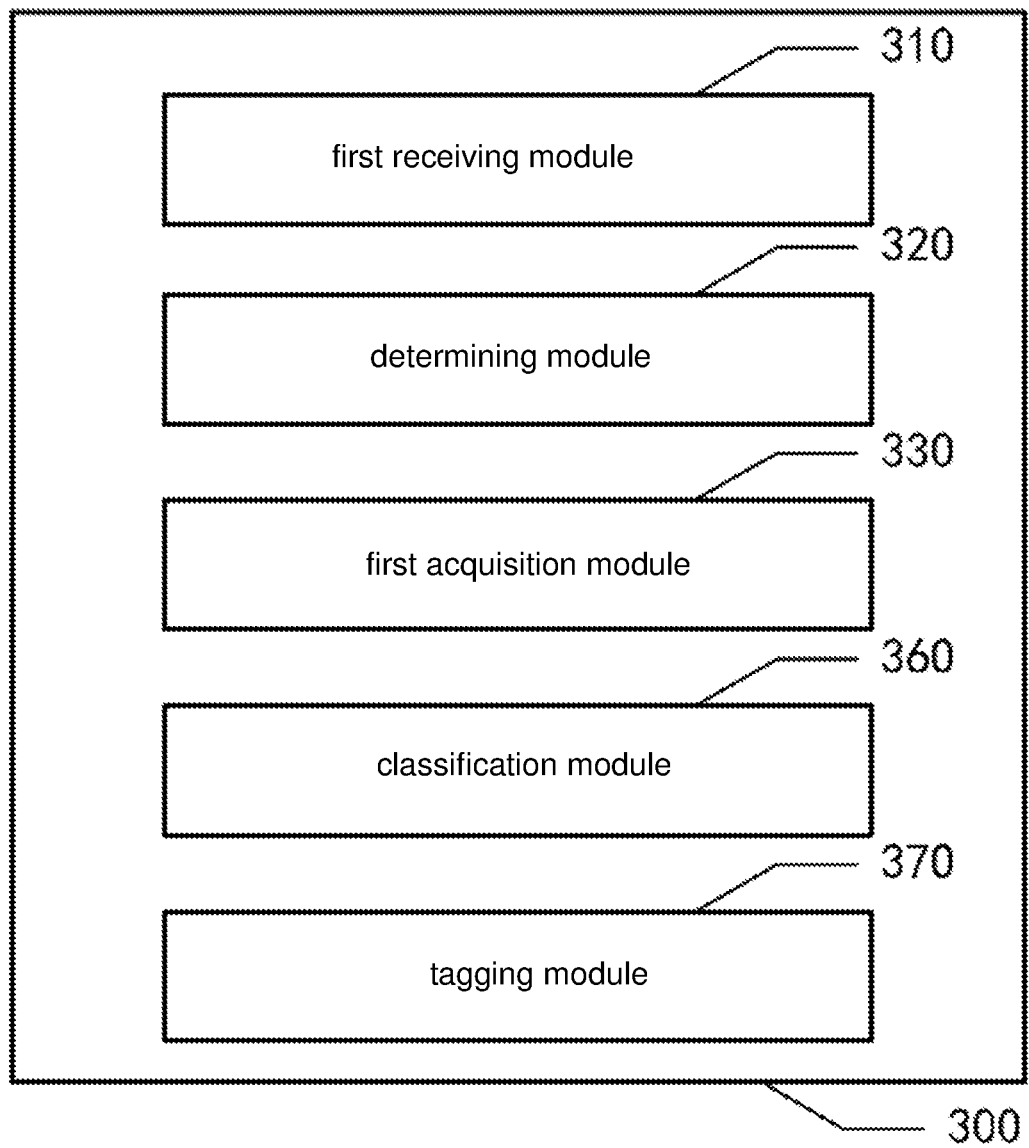
FIG. 13 is a block diagram of an information processing apparatus according to certain other embodiments of the present disclosure.

FIG. 13 is a block diagram of an information processing apparatus according to certain other embodiments of the present disclosure. As shown in FIG. 13, in certain embodiments, there may be a plurality of second applications. The information processing apparatus 300 may include a classification module 360 and a tagging module 370 in addition to a first receiving module 310, a determining module 320, and a first acquisition module 330.

The classification module 360 is configured to classify the plurality of second applications into different categories according to a preset rule before acquiring the identification information of the second applications. The tagging module 370 is configured to tag corresponding identification information to applications belonging to different categories.

According to certain embodiments, when there is a new instant message, the apparatus may directly determine whether an application is allowed to directly acquire the instant message according to its identification information, thereby improving information processing efficiency.

In the embodiments of the present disclosure, a combination of multiple modules, sub-modules, units, and sub-units, or at least some of their functions may be implemented in a single module. Any single module, sub-module, unit, and sub-unit may be split into a plurality of modules. Any one or more of the modules, sub-modules, units, sub-units may be implemented at least partially as hardware circuits, such as field programmable gate arrays (FPGAs), programmable logic arrays (PLAs), system-on-chips (SoCs), system-on-substrates (SoSs), system in packages (SiPs), an application-specific integrated circuits (ASICs), or any other reasonable means of hardware or firmware that integrates or encapsulates the circuit, or implemented by one or any suitable combinations of software, hardware, and firmware. Alternatively, one or more of the modules, sub-modules, units, sub-units may be implemented at least in part as a computer program that, when executed, may perform the corresponding functions.

For example, some of the first receiving module 310, the determining module 320, the first acquisition module 330, the detection module 340, the second acquisition module 350, the classification module 360, the tagging module 370, the third acquisition unit 321, the determining unit 322, the display unit 351, the first receiving unit 352, the first acquisition unit 353, the second receiving unit 354, and the second acquisition unit 355 may be implemented in one module. Any single module or unit may be split into multiple modules. Alternatively, at least some of the functionality of one or more of the modules may be combined with at least some of the functionality of the other modules and implemented in one module. Any of the first receiving module 310, the determining module 320, the first acquisition module 330, the detection module 340, the second acquisition module 350, the classification module 360, the tagging module 370, the third acquisition unit 321, the determining unit 322, the display unit 351, the first receiving unit 352, the first acquisition unit 353, the second receiving unit 354, and the second acquisition unit 355 may be at least partially implemented as a hardware circuit, such as field programmable gate arrays (FPGAs), programmable logic arrays (PLAs), system-on-chips (SoCs), system-on-substrates (SoSs), system in packages (SiPs), an application-specific integrated circuits (ASICs), or any other reasonable means of hardware or firmware that integrates or encapsulates the circuit, or implemented by one or any suitable combinations of software, hardware, and firmware. Alternatively, the first receiving module 310, the determining module 320, the first acquisition module 330, the detection module 340, the second acquisition module 350, the classification module 360, the tagging module 370, the third acquisition unit 321, the determining unit 322, the display unit 351, the first receiving unit 352, the first acquisition unit 353, the second receiving unit 354, and the second acquisition unit 355 may be at least partially implemented as a computer program that, when executed, may perform the corresponding functions.

In another aspect of the present disclosure, an electronic device is provided. The electronic device may include a memory storing computer executable instructions, and a processor for executing the instructions to perform the information processing method according to foregoing description.

Figure 14:
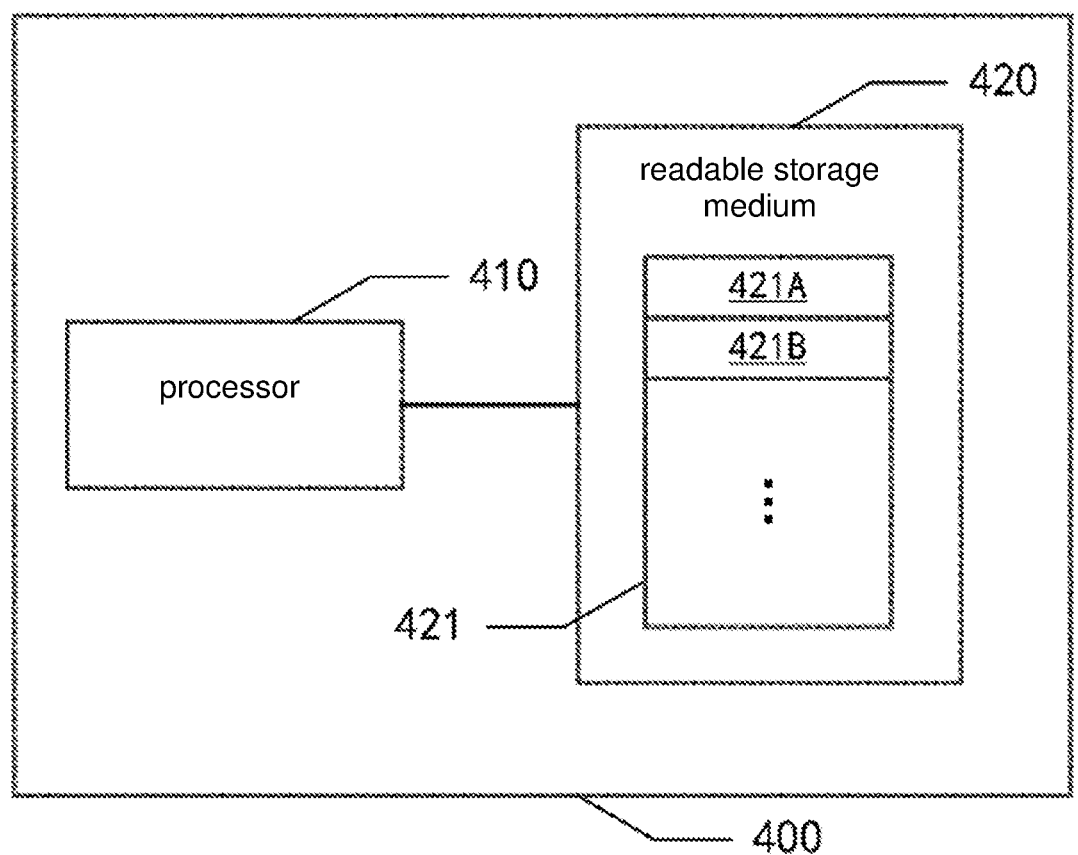
FIG. 14 is a block diagram of an electronic device suitable for implementing the information processing method of the present disclosure according to certain embodiments of the present disclosure.

FIG. 14 is a block diagram of an electronic device suitable for implementing the information processing method of the present disclosure according to certain embodiments. The electronic device shown in FIG. 14 is an example, and should not impose any limitation on the function and scope of use of the embodiments of the present disclosure.

As shown in FIG. 14, the electronic device 400 may include a processor 410 and a computer readable storage medium 420. The electronic device 400 may perform the information processing method according to certain embodiments of the present disclosure.

In particular, processor 410 may include, for example, a general purpose microprocessor, an instruction set processor, and/or a related chipset and/or a special purpose microprocessor (e.g., an application specific integrated circuit (ASIC)), and the like. Processor 410 may also include onboard memory for caching purposes. Processor 410 may be a single processing unit or a plurality of processing units for performing different operations of the methods according to certain embodiments of the present disclosure.

Computer readable storage medium 420, for example, may be any medium that can contain, store, communicate, propagate or transport instructions. For example, a readable storage medium may include an electronic, magnetic, optical, electromagnetic, infrared, or semiconductor system, apparatus, device, or propagation medium. Specific examples of the readable storage medium include: a magnetic storage device such as a magnetic tape or a hard disk drive (HDD); an optical storage device such as a compact disk (CD-ROM); a memory such as a random-access memory (RAM) or a flash memory; and/or a wired/Wireless communication link.

The computer readable storage medium 420 may include a computer program 421 that can include code/computer executable instructions that, when executed by the processor 410, cause the processor 410 to perform an information processing method according to certain embodiments of the present disclosure or of variations thereof.

Computer program 421 may be configured to have computer program code, for example, including a computer program module. For example, in an exemplary embodiment, the code in computer program 421 may include one or more program modules, including, for example, modules 421A, 421B, and so on. It should be noted that the division manner and number of modules are not fixed, and those skilled in the art may use suitable program modules or program module combinations according to the application.

When these program module combinations are executed by the processor 410, the processor 410 may perform the method according to certain embodiments of the present disclosure or any variation thereof.

According to certain embodiments, at least one of the first receiving module 310, the determining module 320, the first acquisition module 330, the detection module 340, the second acquisition module 350, the classification module 360, the tagging module 370, the third acquisition unit 321, and the determining unit 322, the display unit 351, the first receiving unit 352, the first acquisition unit 353, the second receiving unit 354, and the second acquisition unit 355 may be implemented as a computer program module described with reference to FIG. 14. When executed by the processor 410, the corresponding operations in the foregoing modules or units may be implemented.

The present disclosure also provides a computer readable medium, which may be included in the apparatus/device/system described in the above embodiments; or may be separately present without being incorporated into the apparatus/device/system. The computer readable medium may store one or more programs that implement the information processing method in the foregoing description when the one or more programs are executed.

According to certain embodiments, the computer readable medium may be a computer readable signal medium or a computer readable storage medium or any combination of the two. The computer readable storage medium may be, for example, an electronic, magnetic, optical, electromagnetic, infrared, or semiconductor system, apparatus, or device, or any combination of the above. More specific examples of computer readable storage media may include electrical connections having one or more wires, portable computer disks, hard disks, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing. In the present disclosure, a computer readable storage medium may be any tangible medium that can contain or store a program, which can be used by or in connection with an instruction execution system, apparatus, or device. While in the present disclosure, a computer readable signal medium may include a data signal that is propagated in the baseband or as part of a carrier, carrying computer readable program code. Such propagated data signals may take a variety of forms including electromagnetic signals, optical signals, or any suitable combination thereof. The computer readable signal medium may also be any computer readable medium other than a computer readable storage medium, which can transmit, propagate, or transport a program for use by or in connection with an instruction execution system, apparatus, or device. Program code embodied on a computer readable medium can be transmitted by any suitable medium, including wireless, wireline, optical cable, radio frequency signals, and the like, or any suitable combination thereof.

The flowchart and block diagrams in the drawings illustrate the architecture, functionality, and operation of possible implementations of systems, methods, and computer program products according to various embodiments of the present disclosure. In this regard, each block of the flowchart or block diagrams may represent a module, a program segment, or a portion of code that includes one or more logic functions for implementing the specified executable instructions. Alternatively, the functions described in the blocks may be performed in a sequence different from as shown in the diagrams. For example, two blocks shown in succession may in fact be executed substantially in parallel, and they may sometimes be executed in the reversed order, depending upon the functionality involved. Further, each block of the block diagrams or flowcharts, and combinations of blocks in the block diagrams or flowcharts, may be implemented in a dedicated hardware-based system that performs the specified function or operation, or be implemented with a combination of dedicated hardware and computer instructions.

It will be appreciated by those skilled in the art that variations and/or combinations may be made based on the features in the various embodiments of the present disclosure, even if such variations or combinations are not explicitly described herein. All such variations and/or combinations fall within the scope of the disclosure.

What is claimed is:

1. An information processing method for an electronic device, comprising:
   receiving a message through a first application installed on the electronic device;
   determining whether a second application installed on the electronic device has a permission to identify the message received by the first application;
   in response to the second application having the permission to identify the message received by the first application, the second application performing an operation in relation to the message, including:
      acquiring target information in the message by the second application; and
      performing the operation by the second application according to the target information; and
   in response to the second application not having the permission to identify the message received by the first application:
      detecting whether an event listener has been registered in an operating system of the electronic device, wherein the event listener is configured to inform the second application that the first application has received a message; and
      in response to the event listener having been registered in the operating system, acquiring the target information in the message by the second application, and performing the operation by the second application according to the target information.

2. The method according to claim 1, wherein acquiring the target information in the message by the second application comprises:
   displaying a control in a display area of the electronic device, wherein the control indicates that the event listener has been registered in the operating system;
   receiving a user operation on the control; and
   after receiving the user operation on the control, acquiring the target information in the message by the second application.

3. The method according to claim 1, wherein acquiring the target information in the message by the second application comprises:
   receiving, by the second application, the message forwarded from the operating system; and
   acquiring the target information in the message by the second application according to the message forwarded from the operating system.

4. The method according to claim 1, wherein determining whether the second application has permission to identify the message received by the first application comprises:
   acquiring identification information corresponding to the second application; and determining, according to the identification information corresponding to the second application, whether the second application has the permission to identify the message received by the first application.

5. The method according to claim 4, wherein the second application is one of a plurality of second applications, and before acquiring identification information corresponding to any of the plurality of second applications, the method further comprises:
classifying the plurality of second applications into a plurality of application types according to a rule, each second application being assigned an application type; and
tagging corresponding identification information to each of the plurality of second applications according to the corresponding application type.

6. An information processing apparatus, comprising:
a memory storing computer instructions; and
a processor configured to execute the computer instructions to perform:
receiving a message through a first application installed on the electronic device;
determining whether a second application installed on the electronic device has a permission to identify the message received by the first application; and
in response to the second application having the permission to identify the message received by the first application, the second application performing an operation in relation to the message, including:
acquiring target information in the message by the second application; and
performing the operation by the second application in according to the target information; and
in response to the second application not having the permission to identify the message received by the first application:
detecting whether an event listener has been registered in an operating system of the electronic device, wherein the event listener is configured to inform the second application that the first application has received a message; and
in response to the event listener being registered in the operating system, acquiring the target information in the message by the second application, and performing the target operation by the second application according to the target information.

7. The electronic device according to claim 6, wherein the processor is further configured to perform:
displaying a control in a display area of the electronic device, wherein the control indicates that the event listener has been registered in the operating system;
receiving a user operation on the control; and
after receiving the user operation on the control, acquiring the target information in the message by the second application.

8. The electronic device according to claim 6, wherein the processor is further configured to perform:
receiving, by the second application, the message forwarded from the operating system; and
acquiring the target information in the message by the second application according to the message forwarded from the operating system.

9. The electronic device according to claim 6, wherein the processor is further configured to perform:
acquiring identification information of the second application; and
determining, according to the identification information corresponding to the second application, whether the second application has the permission to identify the message received by the first application.

10. The electronic device according to claim 9, wherein the second application is one of a plurality of second applications, and the processor is further configured to perform:
classifying the plurality of second applications in to a plurality of application types according to a preset rule, each second application being assigned an application type; and
tagging corresponding identification information to each of the plurality of second applications according to the corresponding application type.

11. An information processing method for an electronic device, comprising:
receiving a message through a first application installed on the electronic device;
determining whether a second application installed on the electronic device has a permission to identify the message received by the first application; and
in response to the second application not having the permission to identify the message received by the first application:
detecting whether an event listener has been registered in an operating system of the electronic device, wherein the event listener is configured to inform the second application that the first application has received a message; and
in response to the event listener having been registered in the operating system, acquiring target information in the message by the second application, and performing a operation by the second application according to the target information.

* * * * *